United States Patent

[11] 3,617,706

| [72] | Inventor | George S. Oberhart<br>San Mateo, Calif. |
|---|---|---|
| [21] | Appl. No. | 855,068 |
| [22] | Filed | Aug. 4, 1969 |
| [45] | Patented | Nov. 2, 1971 |
| [73] | Assignee | Cred-X Corporation<br>San Mateo, Calif. |

[54] VERIFICATION SYSTEM
5 Claims, 9 Drawing Figs.

[52] U.S. Cl. .................................................. 235/61.7 B,
235/61.11 K, 340/149 A
[51] Int. Cl. ...................................................... G06k 9/00
[50] Field of Search............................................ 235/61.12
NP, 61.12 C, 61.12, 61.111, 61.112, 61.113, 61.7
B; 340/149, 149 A; 174/68.5

[56] References Cited
UNITED STATES PATENTS

| 2,353,061 | 7/1944 | Oldenboom.................. | 235/61.11 |
| 2,478,274 | 8/1949 | Johnson ....................... | 235/61.11 |
| 3,308,238 | 3/1967 | Brothman et al. ............ | 235/61.7 |
| 3,450,953 | 6/1969 | Gardner........................ | 340/149 |
| 3,469,240 | 9/1969 | Ryden ........................... | 235/61.12 |
| 3,470,359 | 9/1969 | Esterly ......................... | 235/61.12 |

*Primary Examiner*—Thomas A. Robinson
*Attorney*—Naylor & Neal

ABSTRACT: A system employing wire-encoded cards and a card verification machine which is selectively adjustable to establish connection with the wires in a card and complete a circuit therethrough. Adjustment of the machine in accordance with a code establishes a predetermined partial circuit therein which complements a partial circuit provided by the wires in the card. The cards may be of the credit card type and for this purpose the system also includes wire encoded vouchers and a partial circuit within the machine which is adjustable to complement the wire encoding of the voucher. The machine is provided with a circuit interrupter to detect fraudulent cards and deactivating structure for the printer to prevent misuse of the printer.

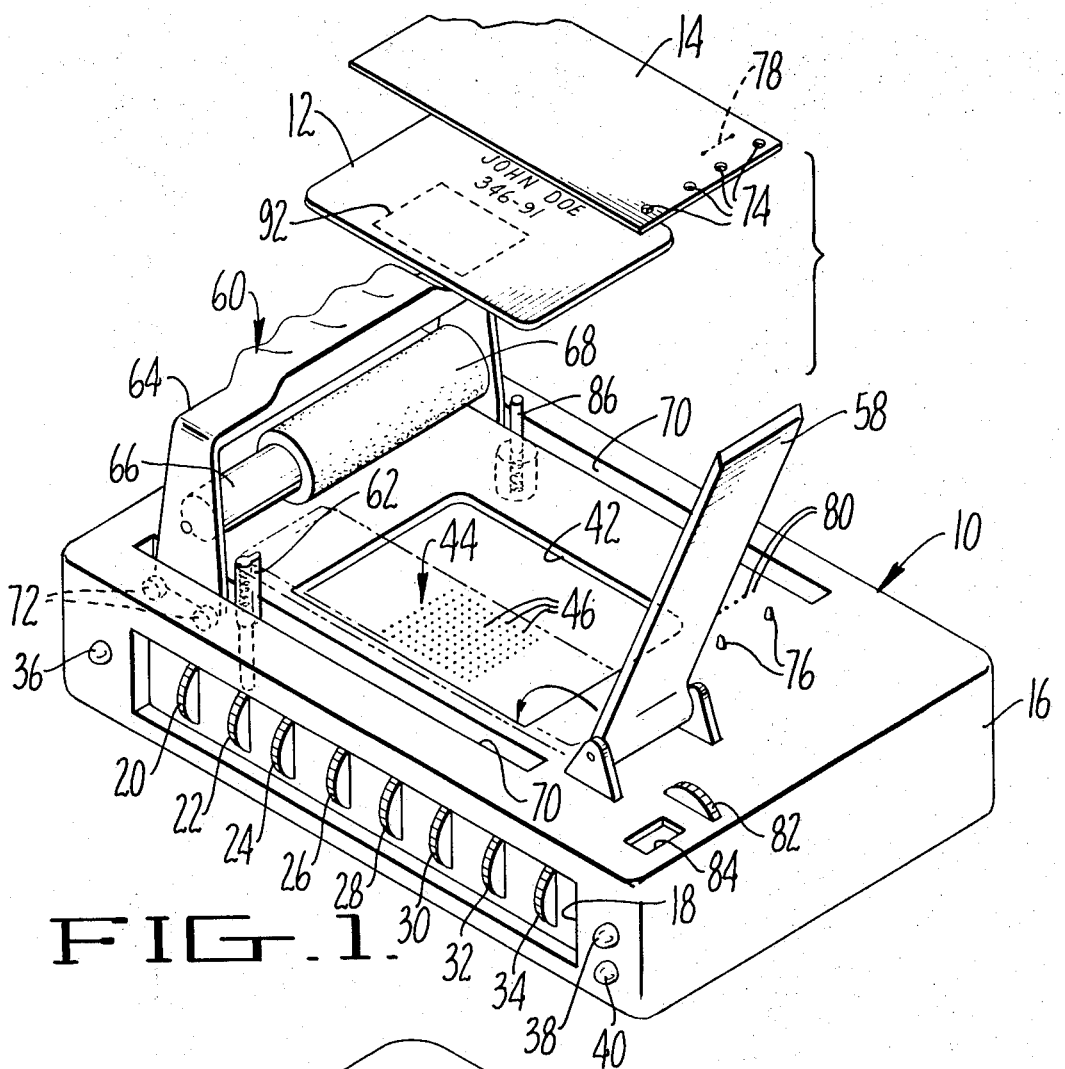

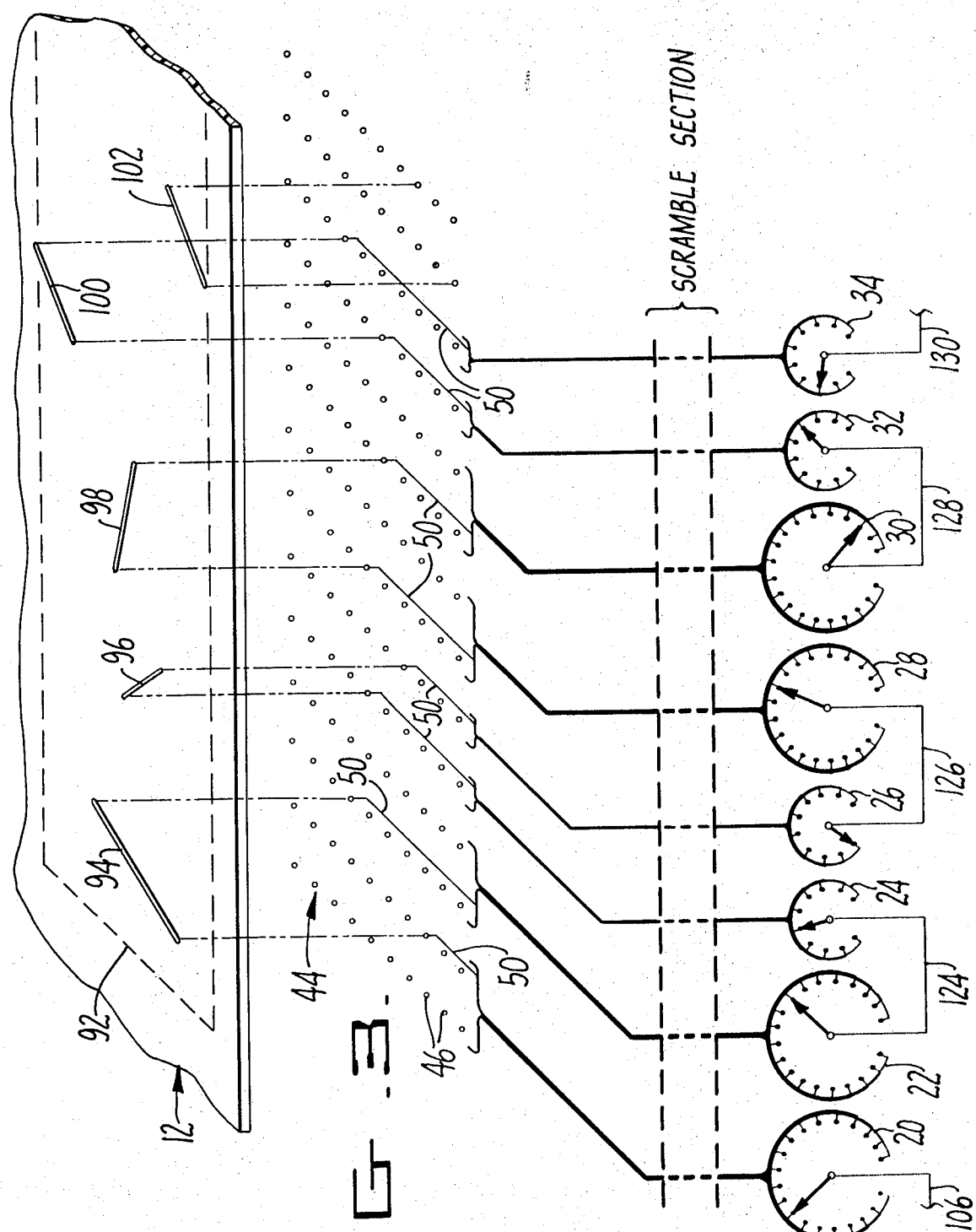

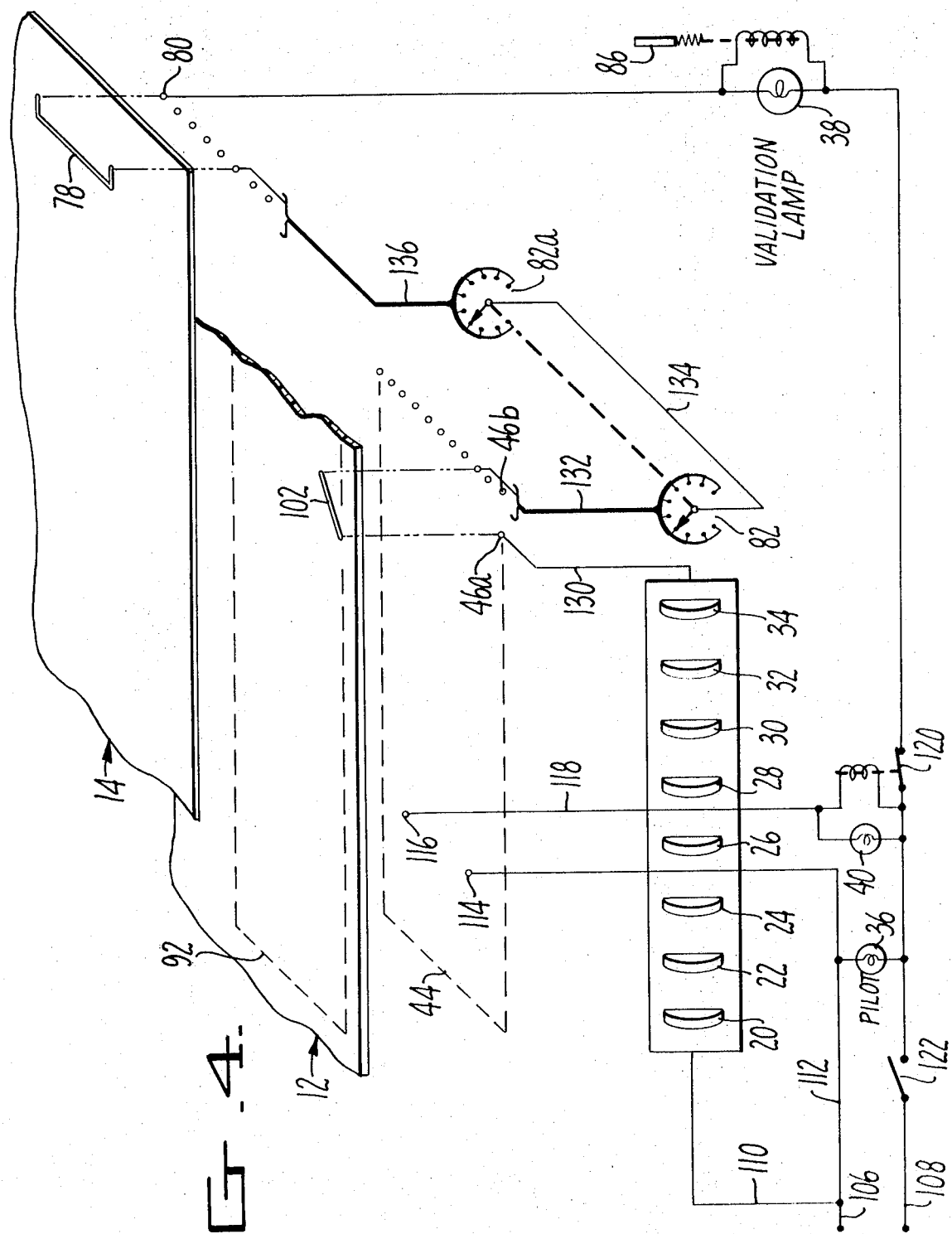

INVENTOR.
GEORGE S. OBERHART
BY Naylor & Neal
ATTORNEYS

INVENTOR.
GEORGE S. OBERHART
BY
*Naylor & Neal*
ATTORNEYS

VERIFICATION SYSTEM

BACKGROUND OF THE INVENTION

The present invention relates to the art of automatic verification systems and is particularly concerned with a system adapted for the verification of credit cards. In its more specific aspects, the invention is concerned with a system wherein the item to be verified is encoded with an unique electrical circuit which requires the presentation of a numerical combination for verification purposes.

In the prior art, electrically and magnetically encoded cards for use in verification systems are well-known. Electrically encoded cards have been suggested primarily for use with electrical locks where the card functions as a key. U.S. Pat. No. 3,134,254 suggests such an arrangement wherein the key is either encoded with a resistance or capacitance component. In this patent, the key is verified through an oscillator circuit which is turned for acceptance of only a properly encoded card. While the circuit is capable of adjustment to accommodate different keys, this adjustment may not be accomplished in a ready and selective manner so that the same verifying mechanism might be employed for the ready verification of differently encoded keys. Thus, the circuit is not well suited for credit card verification purposes.

Magnetically encoded cards have been suggested primarily for use in identification systems wherein it is desired to repeatedly change the encoding of the cards. These systems require relatively complex readout and recording means and typically rely upon the employment of some type of master recording for comparison purposes. The magnetic character of the encoded cards renders them susceptible to inadvertent change and the readout and recording systems are, inherently, relatively complex. Both of these characteristics, together with the requirement for some type of master recording for comparison purposes, render systems of this type ill-suited for mass credit card verification.

In addition to the electrical and magnetic verification systems of the aforedescribed type, the prior art also suggests electromechanical readout systems for use with embossed or perforated credit cards. These systems have been suggested for employment in large credit card operations to determine whether a particular card has been invalidated. They rely on a relatively complex system of electrical comparison and are not well-suited for verifying the identity of the card user.

The present invention, as will become more apparent from the following detailed description, provides a system for verifying the authority of the card user. The system employs very simple electrical components which are inexpensive, durable, and easy to operate. The identification cards are permanently encoded and the verification machines are so simple that they may be provided wherever identification is desired. For example, it is anticipated that in retail sales the machines might be provided at each cash register, or possibly even for each sales clerk.

SUMMARY OF THE INVENTION

The verification system of the present invention employs cards encoded with partial electric circuits and verification machines having selectively variable circuits incorporated thereinto which may be adjusted to complement the circuitry of the cards. Each card comprises an encoded area having a plurality of mutually isolated discrete points thereon, a plurality of electrical conducting means extending between at least some of the points, and contact means exposing the points connected by the electrical means for contact from the exterior of the card. To distinguish between the cards, each of the cards is encoded with a distinct combination of conducting means. The machine for verifying the encoding of the cards comprises a plurality of contacts disposed for contact with the contact means of a card; a plurality of switches each of which is operatively associated with a discrete plurality of the contacts to selectively establish electrical connection with a preselected contact associated therewith; circuitry electrically interconnecting the switches to establish a completed electrical circuit therethrough upon connection of the preselected contacts; and, a signal to indicate the completion of a circuit through the machine. The latter condition occurs when the circuitry within the machine is adjusted to complement the partial circuitry within a card associated therewith.

The contacts and switches of the machine are interconnected by "scrambled" circuitry to avoid literally all likelihood that the machine might be adjusted through a trial and error technique to achieve a condition wherein the circuitry therein is adjusted to complement a card associated therewith. From the following detailed description, it will also be seen that the machine may be provided with means to indicate the presence of a fraudulent card and with voucher processing and protection means to facilitate it for use in credit card operations.

A principal object of the present invention is to provide a verification system wherein verification is effected by the employment of simple electrical circuitry, without the necessity of electronic or magnetic components. With respect to this object, it is another and related object to provide such a system employing unique and selectively variable "scrambled" circuitry.

Still another object of the invention is to provide a verification system wherein complex comparative data is not required for verification purposes.

These and other objects and the detailed construction and mode of operation of the invention will become more apparent from the following description and the accompanying drawings.

BRIEF DESCRIPTION OF THE DRAWINGS

FIG. 1 is a perspective view illustrating the verification machine, credit card and voucher of the present invention.

FIG. 2 is a perspective view illustrating the card, with a portion thereof broken away to illustrate the internal circuitry.

FIG. 3 is a diagrammatic perspective view illustrating the manner in which the internal circuitry of the machine and card cooperate to complement each other for verification purposes.

FIG. 4 is a diagrammatic perspective view illustrating the protection circuitry within the card and verification machine to indicate the presence of a fraudulent card and the complemental verification circuitry within the machine and the voucher designed for use therewith.

DESCRIPTION OF THE ILLUSTRATED EMBODIMENT

Figure 5:
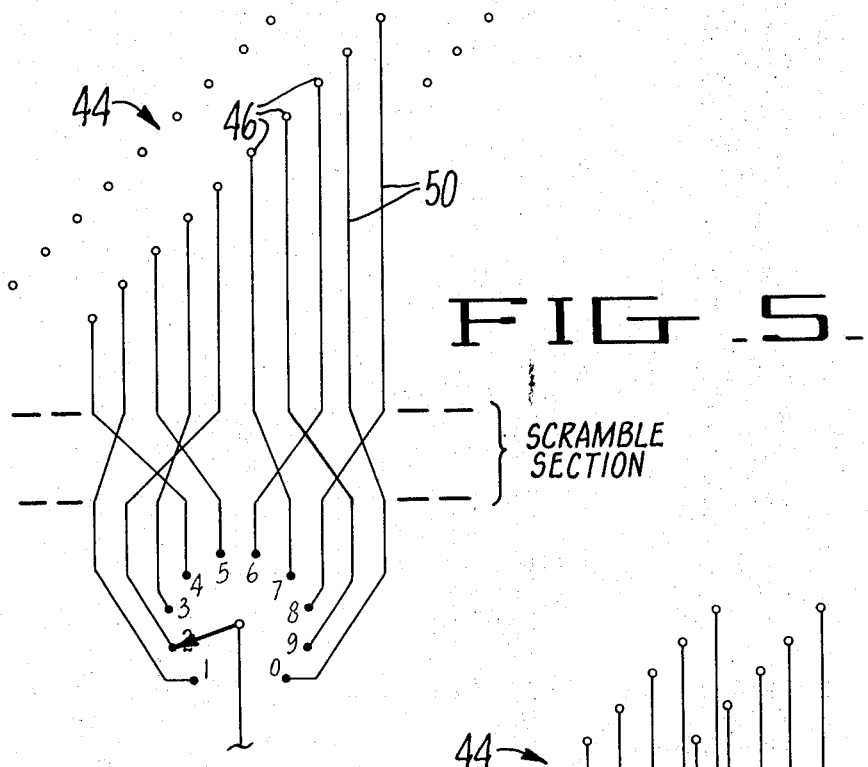
FIGS. 5 and 6 are diagrammatic views illustrating the scrambled circuitry associated with the 10 and 20 point switches, respectively, of the verification machine.

Referring now to FIG. 1, the verification or validation machine is designated 10 and the card and voucher are designated 12 and 14, respectively. The basic component of the machine comprises a housing 16 within which the validation circuitry is confined. The forward side of the housing is provided with a recess 18 within which a plurality of multiple position rotary switches 20, 22, 24, 26, 28, 30, 32 and 34, respectively, are mounted. These switches, as will become more apparent from the following detailed description, provide for the selective adjustment of the circuitry within the machine. Numerical and alphabetical indicia (not illustrated in FIG. 1) associated with the switches provide for the adjustment of the switches in accordance with a predetermined code. The forward side of the machine also carries an on-off pilot light 36; a validation signalling light 38; and, a fraud signalling light 40. The operation of these lights will also become more apparent from the following detailed description of the circuitry.

Figure 8:
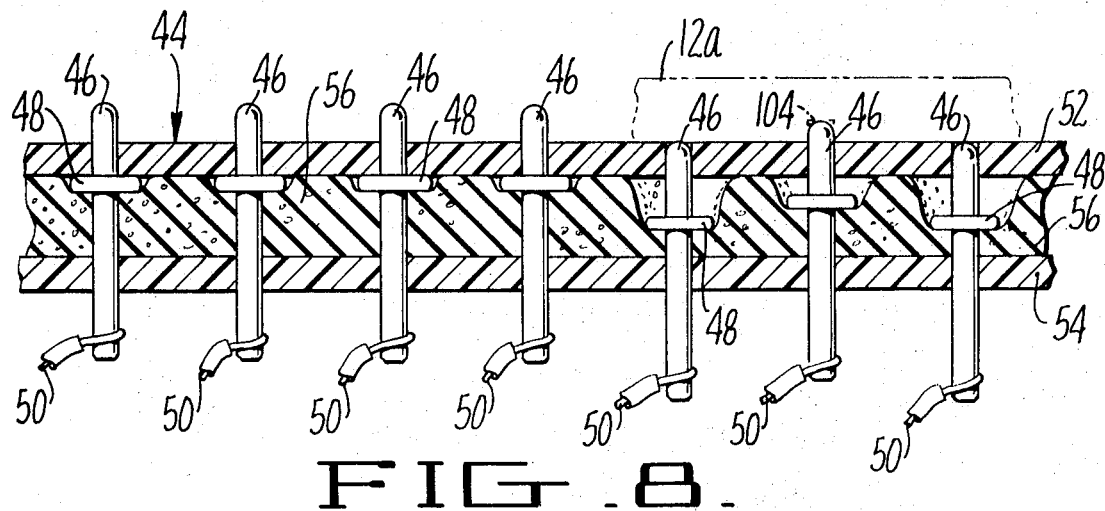
FIG. 8 is a partial cross-sectional view of the credit card contacting block incorporated into the verification machine of the invention.

The upper side of the machine 10 is formed with a recess 42 proportioned for receipt of the card 12. This recess is provided with a contact area 44 within which a plurality of mutually isolated contact pins are disposed. These pins are arranged in a gridlike pattern and disposed so as to be resiliently biased outwardly into the recess 42 for contact with the encoded area of a card received therein. The construction of the contact area may be seen from FIG. 8 wherein the pins are designated by the numeral 46. Each pin is provided with a collar 48 fixed thereto intermediate its ends, a crowned upper end and an extended lower end to which an electrical lead wire is connected. Representative lead wires are designated in FIG. 8 by the numeral 50. The pins are slidably supported in a pair of spaced apertured plates 52 and 54 and normally urged to the extended condition by a resilient rubberlike mat 56 interposed between the plates. The mat is also apertured to receive the pins and the collars 48 are disposed so as to bear against the upper surface of the mat. The four pins illustrated to the left of FIG. 8 are shown in the extended condition they normally assume under the influence of the mat. The three pins to the right of FIG. 8 are shown in varying degrees of compression as might occur upon forcing of the pins downwardly by the disposition of a card thereagainst. A portion of a card is illustrated in phantom line representation above the depressed pins and designated by the numeral 12a. The mat 56 may be fabricated of any suitable elastomeric material, such as rubber. To prevent the pins from shorting to one another, the mat and both of the plates 52 and 54 should be fabricated of electrically nonconductive material.

The upper side of the housing 16 also carries a card-retention bar 58 and a voucher receiving and printing mechanism designated in its entirety by the numeral 60. The bar 58 is hingedly mounted on the housing for swinging movement between the positions illustrated in solid and phantom line representation in FIG. 1. In the solid line position, the bar permits a card to be freely inserted into or removed from the recess 42. When in the phantom line position with a card received within the recess 42, the bar functions to lock the card in place and force it securely against the contact area 44. In the phantom line or "closed" condition, the bar also functions to depress a spring-biased stop pin 62 disposed in the path of the mechanism 60. The pin 62 normally assumes the extended position illustrated in FIG. 1 to lock the mechanism 60 in an inoperative condition. Upon being depressed by the plate 58, the pin is moved to a position wherein it releases the mechanism.

The voucher-printing mechanism comprises, as its basic element, a bail 64 having a roller 66 rotatably suspended between its legs. The roller 66 is of relatively conventional character and carries a pad 68 designed to roll over the embossed printed surface of a credit card to effect the printing of a voucher. The distal ends of the bail are received in slots 70 formed in the upper side of the housing 16 and carry rollers 72 (only two of which are illustrated) supported within the slots. The slots are grooved (not illustrated) to receive the rollers so that the rollers support the bail 64 for back-and-forth movement within the slots, while restraining the bail from complete removal from the slots.

The bar 58 and roller 66 are so positioned and proportioned that the mechanism 60 must be moved to the fully retracted position illustrated in FIG. 1 before the bar can be moved between the open and closed positions illustrated by the solid and phantom line representations, respectively, of the bar illustrated in FIG. 1. Thus, the mechanism 60 must be fully retracted in order to permit the removal of a card from the recess 42 and the mechanism 60 is locked by the pin 62 whenever the bar 58 is swung to the open position to permit insertion or removal of a card from the recess 42. The bar 58 and roller 66 are also so positioned and proportioned that the pad 68 rolls against the upper surface of the bar when the bar is in the closed condition. This interaction functions to force the bar securely against a card received within the recess 42 and, thus, acts to force the card against the contact area 44.

The upper surface of the housing 16 also provides for the support of a voucher 14 in a position juxtaposed over a card received within the recess 42 and disposed within the path of the pad 68 for rolling engagement thereby. To facilitate alignment in this position, the voucher is provided with perforations 74 and the upper surface of the housing 16 is provided with pins 76 (only two of which are illustrated) engageable with these perforations. In operation, with the machine conditioned as illustrated in FIG. 1, the card 12 is first positioned within the recess 42 and then the voucher 14 is positioned over the card with the perforations 74 engaged over the pins 76. The retention bar 58 is then lowered to the closed condition, thus locking the card within the recess 42. The retention bar also overlaps part of voucher 14 to secure the voucher against removal when the bar is in the closed condition.

For cooperation with a wire-encoded area, designated 78, on the voucher 14, the upper surface of the housing 16 also carries a plurality of contact pins 80. These pins extend upwardly from the upper surface of the housing 16 and may be mounted similarly to the pins 46. To complete the verification circuit within the machine, as will become more apparent from the subsequent discussion, it is necessary that a preselected pair of the pins 80 be connected through means of the wire-encoded area 78. The encoding of the area 78 is unique for each credit card source (i.e. the bank, store or other source from which the cards are issued) so that the voucher employed with a particular credit card must originate from the same source as the card. Adjustment of the circuitry for the contact pins 80 to accommodate a particular credit card source is effected through means of a rotary switch 82 mounted on the upper surface of the housing 16. The mode of operation of the switch will be developed in detail in the subsequent discussion of the circuitry within the machine. The switch 82 carries credit card source indicating indicia which may be viewed through a window 84 formed in the housing 16 adjacent the switch.

In addition to the stop pin 62, a solenoid-operated stop pin 86 is also disposed in the path of the mechanism 60 to normally lock the mechanism in the inoperative position illustrated in FIG. 1. The pin 86 is normally spring-biased to the locking position and, upon actuation of the solenoid associated therewith, is retracted to free the mechanism 64. The solenoid, as will become more apparent from the subsequent discussion, is wired into the validation circuitry of the machine so that it is only activated to retract the pin 86 upon the completion of a validation circuit.

Figure 7:
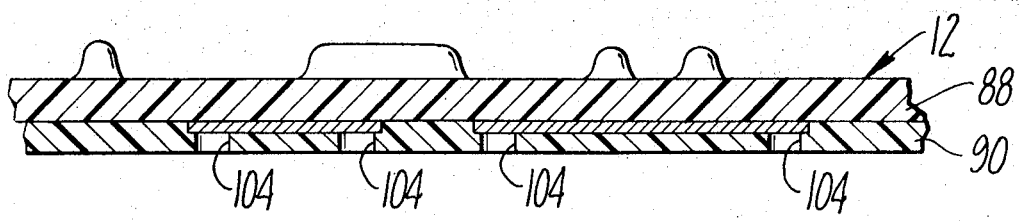
FIG. 7 is a partial cross-sectional view of a credit card constructed according to the invention.

Referring now to FIG. 2, the card 12 therein is shown as comprising upper and lower laminates 88 and 90 adhered together in face to face contact. The card user's name and account number are embossed into the card in relatively conventional manner so as to project upwardly from the upper surface of the laminate 88. The lower laminate 90 is provided with an encoded area 92 which defines a plurality of mutually separated discrete points arranged in a gridlike pattern corresponding to that of the contact pins within the contact area 44. The points within the area 92 are disposed so as to assume alignment with the respective contact pins 46 within the area 44 upon receipt of the card 12 in the recess 42. Certain of the points in the area 92 are interconnected by printed circuit wires, designated 94, 96, 98, 100 and 102, respectively, printed directly on the upper surface of the laminate 90. These wires are mutually insulated and isolated from one another and, through the distinct combination of points interconnected thereby, function to encode the card with a distinct partial circuit. When the card is in the fully assembled condition, the wires are sandwiches between the laminate 88 and laminate 90, as can be seen from FIG. 7. The laminate 90 is perforated at points at the ends of each of the wires so as to expose the ends from the underside of the card. These perforations may be seen from FIG. 7 and are designated by the numeral 104.

Figure 9:
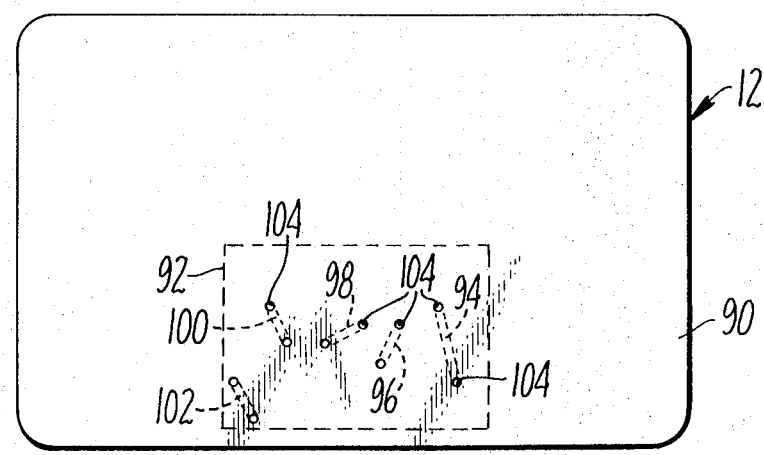
FIG. 9 is a plan view illustrating the underside of the credit card illustrated in FIG. 2.

While the encoded area 92 has been described as having a plurality of mutually isolated distinct points, it should be understood that only the points interconnected by the printed circuit wires need present a physical appearance. The gridlike pattern shown in FIGS. 2 and 9 illustrate a 10 by 14 grid which provides 140 points. Only 10 of the points, however, are interconnected by the printed wires and distinctly presented through the perforations 104. The appearance of the perforations from the bottom of the card may be seen from FIG. 9. The perforations are proportioned so as to slidably receive the pins 46 aligned therewith upon receipt of the card within the recess 42. Thus, the pins aligned with the perforations contact the printed wires associated therewith and each wire functions to electrically interconnect the pins at opposite ends thereof. It is through the latter function, as will become more apparent from the following detailed discussion, that the card functions to complement the circuitry within the machine 10 for validation purposes.

While the card 12 is illustrated as comprising superimposed laminates having the printed circuitry interposed therebetween, it is also anticipated that the card might comprise a single layer and that the printed circuitry could be applied directly to one surface of the card so as to be in an exposed condition. With this arrangement, the wires s would be externally exposed and there would be no need for any type of perforations to permit connection to the wires. The pins 46 would simply extend into direct contact with the distal ends of the wires. Where the wires are to be externally exposed, a highly wear-resistant wire-imprinting process should be employed, such as that known as the "metal foil hot-stamp process." Where the wires are internally exposed between the laminates, a less wear-resistant process, such as that known as "silver line," may be employed. The disposition of the printed wires directly on the external surface of the card has the advantage that no perforations need be provided in the card for contact purposes. Thus, all likelihood that such perforations might become fouled is avoided.

FIG. 3 diagrammatically illustrates the manner in which the basic circuitry within the validation machine 10 operates. From this figure, it can be seen that the switches 20, 22, 28 and 30 are of the 20 place type and the switches 24, 26, 32 and 34 are of the 10 place type. The contacts of the 20 place switches are identified alphabetically, as can be seen from FIG. 6, and the contacts of the 10 place switches are identified numerically, as can be seen from FIG. 5. Through this arrangement, the switches can be adjusted in accordance with a combination of eight alphabetical and numerical components, such as: DE 25 JM 37. This type of alphabetical and numeral combination has been chosen because it has been found relatively easy to memorize. It should be understood, however, that the invention is in no way limited to the employment of any particular alphabetical and/or numerical coding arrangement.

Figure 6:
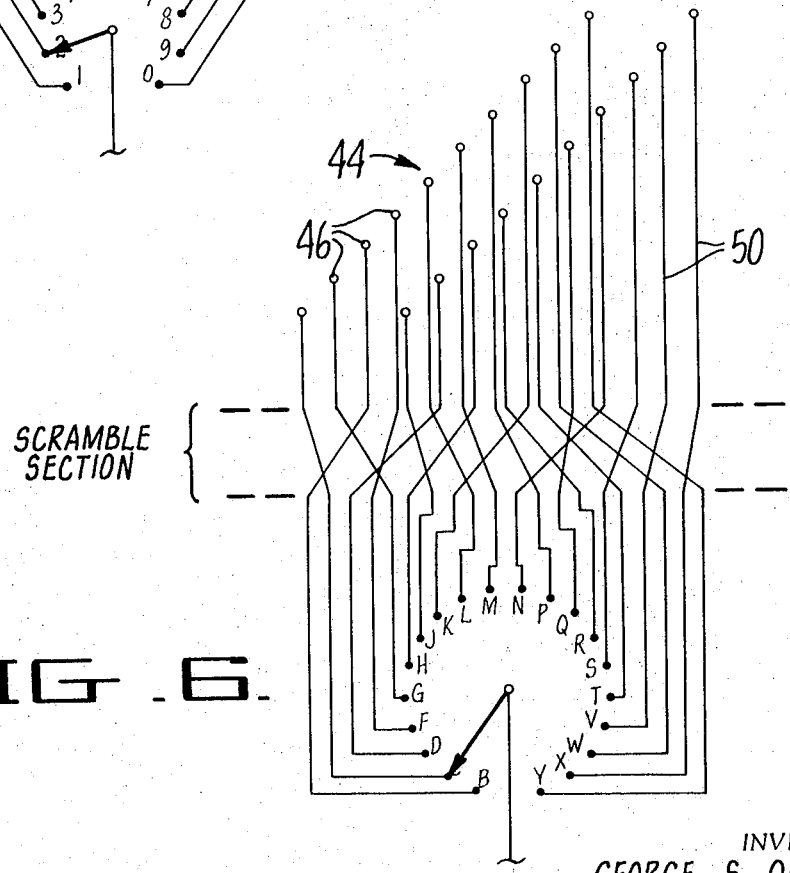

FIG. 3 shows that each of the rotary switches is associated with a discrete plurality of the contact pins 46 corresponding in number to the number of places provided on the switch. Thus, the switches 20, 22, 28 and 30 are each connected to 20 of the pins 46 and the switches 24, 26, 32 and 34 are each connected to 10 of the pins 46. Through selective adjustment of the switches, each switch may be adjusted to establish electrical connection with any one of the discrete number of contact pins 46 associated therewith. Thus, by dialing a code into the switches, electrical connection will be established to eight distinct contact pins 46. The wires connecting each of the switches with the contact pins associated therewith are "scrambled" as diagrammatically illustrated by the scramble section in FIG. 3 in a completely random fashion so that the contact pin 46 connected to a particular place of one of the rotary switches cannot be predicted without a key diagram to indicate the arrangement of the connections. Representative scramble sections for the 10 and 20 place rotary switches are illustrated in FIGS. 5 and 6, respectively. While FIGS. 3, 5 and 6 illustrate the discrete plurality of contact pins associated with each of the switches as being arranged in single or paired lines, it should be understood that there is no necessity for this arrangement and that any random scrambling arrangement might be provided. In other words, the discrete number of contact pins associated with any one of the rotary switches might be placed anywhere within the grid pattern of pins provided in the contact area 44.

The power source arrangement for the validation machine may best be seen from FIG. 4 wherein the input power lines are designated by the numerals 106 and 108, respectively. Ideally, the source connected across these lines is low-voltage DC such as 24 or 48 volts. The line 106 branches into a parallel circuit arrangement with one lead 110 extending to series connection with the rotary switch 20 (see FIG. 3) and another lead 112 extending to a first counterfeit detection pin 114 mounted in the contact area 44 similarly to the contact pin 46. The pin 116 is connected to the input line 108 by a lead 118 having the solenoid of a solenoid-operated relay 120 series connected therein. The relay 120 is interposed in the line 108 so as to break the validation circuit through the line upon completion of the circuit through the lead 118 responsive to connection of the counterfeit detection pins 114 and 116. The latter pins are so disposed as to remain disconnected so long as the machine is operated with valid cards. Electrical connection of the counterfeit detection pins indicates that an overly expansive circuit-completing card, such as a metal plate, has been substituted for a valid credit card. Through the provision of a parallel circuit to the fraud signalling light 40, completion of the circuit through the lead 118 also functions to activate the light.

An on-off switch 122 is incorporated into the input power line 108 to selectively interrupt the circuit therethrough and the pilot light 36 is connected between the line 108 and the lead 112 to indicate the condition of the switch. From the relay 120, the line 108 extends to series connection with the validation signalling light 38 and one of the contact pins 80 for the voucher-validating circuitry. The connection to the latter pin is fixed and does not vary with adjustment of the switch 82. The solenoid-operated stop pin 86 is connected in parallel with the portion of the line 108 in which the validation signalling light 38 is series connected. Thus, completion of the series circuit through this portion of the line 108 functions to both activate the light 38 and energize the solenoid-operated pin 86 to a retracted condition.

The circuitry within the machine 10 is completed by an interrupted series circuit between the rotary switches. The primary portion of this interrupted circuit may be seen from FIG. 3 and comprises: a lead 124 connecting the switches 22 and 24; a lead 126 connecting the switches 26 and 28; and a lead 128 connecting the switches 30 and 32. The secondary portion of this circuit may best be seen from FIG. 4 and comprises a lead 130 connected to the switch 34 (see FIG. 3) and extending to one of the aforesaid contact pins 46, designated 46a for purposes of distinction; and, a plurality of leads 132 (illustrated in FIG. 4 as a single line for purposes of simplicity) extending, respectively contact places of the switch 82. The tertiary and final portion of the interrupted circuit may also be seen from FIG. 4 and comprises: a rotary switch 82a disposed for common rotation with the switch 82 (as diagrammatically represented by the dashed line leading between the switches 82 and 82a in FIG. 4); a lead 134 connecting the switches 82 and 82a; and, a plurality of leads 136 (schematically illustrated by a single line for the sake of simplicity) connected between the respective contact places of the switch 82a and the respective contact pins 80, with the exception of the pin 80 connected to the line 108.

As illustrated, the pins 46a and 46b are disposed in two adjacent rows within the area 44 to one side of the rows of contact pins which are connected to the rotary switches 20, 22, 24, 26, 28, 30, 32 and 34. This arrangement is possible because the latter switches only require 120 contact points and these points may be provided within a 10 by 12 grid pattern, while the grid pattern of the machine is actually 10 by 14. The 13 and 14 rows of the pattern provide the contacts 46a and 46b.

SYSTEM SETUP

In setting up the system, encoded credit cards for the various source companies are issued to the company's customers and at the time of issue the customer is provided with a code which is keyed to his card. In the case of the illustrated system, the code comprises eight characters made up of four letters and four numerals, such as: DE 25 JM 37. The card for each customer is encoded with a distinct code of printed circuit wires which distinguishes it from the cards of other customers. Similarly to conventional credit cards, a plurality of identical cards may be issued to a single customer for use by his family, etc. In addition to the printed wires keyed to the code of the card (e.g. the wires 94, 96, 98 and 100) each card also carries a printed wire 102 keyed to the source company. This is the wire which cooperates with the contacts 46a and 46b.

Setup of the system also requires that verifying machines and vouchers be issued to the retailers, etc., who intend to accept the cards for identification and/or credit purposes. The machines are wired so as to be keyed for cooperation with the cards to be used therewith. The vouchers are encoded with wires 78 so that verification through the machine may only be effected when a card is associated with a properly encoded voucher.

The setup of the aforesaid system contemplates that a single verification machine would be employed to accept cards from different source companies. Where this is not a requirement (e.g. in an oil company service station handling the products of only one company) the system and setup may be considerably simplified by omitting the company verification circuitry from the validation machine and the card and vouchers. This is permissible because the machine operator would only handle vouchers designed for use with the cards of his source company. To effect such an omission, lead 130 could be connected directly to the line 108 so as to be in series with the validation signalling light 38. The solenoid-operated stop pin 86 would be wired for activation simultaneously with the light 38 similarly to the arrangement illustrated in FIG. 4. Within the machine, elements 46a, 46b, 80, 82, 82a, 132, and 136 could be omitted. Similarly, the wire encoded area 78 and the wire 102 could be omitted from the voucher and card, respectively.

SYSTEM OPERATION

In the credit card operation of the system, the card holder would present the card to the merchant or other person who is asked to accept the card and also indicate the coded combination of the card. The card owner would then adjust the rotary switches of the machine in accordance with the combination and adjust the switch 82 to the position of the source company for the card. The source company would normally be indicated on the face of the card in the conventional manner. With the machine so prepared, the merchant would then place the card within the recess 42 and then place a voucher for the source company of the card so that the perforations 74 of the voucher are received on the pins 76. The merchant would then lower the card retention bar 58 to the closed condition and, assuming the machine is properly adjusted and the voucher is properly chosen, the machine would indicate the presence of a valid card and the mechanism 60 would be released for printing of the voucher. Printing of the voucher is effected in conventional manner by simply moving the bail 64 back and forth across the voucher so as to imprint the voucher with the embossed data on the card.

The validation of a card and voucher simultaneously energizes the validation signalling light 38 and retracts the solenoid-operated stop pin 86. Thus, the user of the machine is provided with both a visual and a physical indication that the card is valid and the voucher is matched thereto. This condition results because a series circuit is completed through the various components of the machine and the printed circuitry within the card and voucher. The printed circuitry of a valid card and mating voucher may be said to "complement" the series circuitry provided within the validation machine 10. In the event that any one of the adjustable switches of the machine is not properly adjusted or the voucher does not mate with the card associated therewith, the circuit is interrupted and no validation signal is provided. The absence of the signal also means that the solenoid-operated locking pin 86 remains in an extended condition, thus locking the voucher-printing mechanism 60 in an inoperative condition.

If an effort is made to cheat the machine by presenting a card having an overly extensive electrically conductive material within the area 44, the counterfeit detection pins 114 and 116 will be connected, thus interrupting the validation circuit through the relay 120 and energizing the fraud signalling light 40. The pins 114 and 116 are disposed, as noted in the foregoing discussion, so as to remain in a disconnected condition whenever an authentic card is presented to the machine.

CONCLUSION

It should be understood that the illustrated and described embodiments of the invention are set forth in relatively expanded form for purposes of illustration. In actual practice, it is anticipated that the circuitry within the validation machine would be largely of the "printed" type. This is particularly true of the scramble section which would be fabricated as a printed circuit encapsulated in an opaque material which would destroy the circuitry in the event that the encapsulation material were removed. The latter feature is highly desirable to avoid the possibility that the code of the machine could be broken by exploration of the scramble section circuitry.

I claim:

1. In combination with a credit card having incorporated thereinto imprinting embossments and machine readable identification means, an improved apparatus for receiving the card for machine reading and imprinting from the embossments onto a voucher, said apparatus comprising:
    a. a base member having card-receiving means adapted to receive said card and a machine reader to read the readable identification means on a card received within said card-receiving means;
    b. voucher support means on said base member to support a voucher in juxtaposition to the imprinting embossments of a card received in the card-receiving means;
    c. voucher-imprinting means mounted relative to said base member for select movement across a voucher supported by the voucher support means to and from a condition to one side of the voucher to imprint the embossments onto said voucher responsive to such movement;
    d. card retention means support on said base member for selective movement between a condition permitting insertion of a card into and removal of a card from the card-receiving means and a condition locking a card within the card-receiving means for reading by the machine reader therein; and,
    e. retention-responsive lock means to maintain the voucher-imprinting means in a condition to one side of a voucher supported by the voucher support upon disposition of the card retention means in the condition permitting insertion of a card into and removal of a card from the card receiving means and to release the voucher-imprinting means for movement across said voucher upon disposition of the card retention means in the condition locking a card within the card-receiving means.

2. In a combination according to claim 1, the improved apparatus further comprising voucher-securing means supported on said base member for selective movement between a condition permitting positioning of a voucher on and removal of a voucher from the voucher support means and a condition securing a voucher against removal from the voucher support means and wherein the retention-responsive lock means is operatively associated with the voucher-securing means to prevent movement of the securing means to the condition permitting positioning of a voucher on and removal of a voucher from the support means until the imprinting means is moved to a position to one side of a voucher support on the support means and to lock to imprinting means in a condition to one side of a voucher supported on the support means when the securing means is in the condition permitting placement of a voucher on and removal of a voucher from the support means.

3. In a combination according to claim 1, the improved apparatus further comprising: reader-responsive lock means to maintain the voucher-imprinting means in a condition to one side of a voucher supported by the voucher support means until such time as the machine reader senses the presence of a predetermined condition on a card received within the card receiving means.

4. A credit card verification system comprising:
 a. a plurality of credit cards, said cards being encoded with means to indicate the origin thereof;
 b. a plurality of vouchers, said vouchers being encoded with means to indicate the origin thereof;
 c. a machine for imparting indicia from said cards to said vouchers, said machine comprising:
  1. receiving means to receive a card and voucher, said means being capable of receiving cards and vouchers emanating from a plurality of origins;
  2. indicia-imparting means to selectively impart indicia from a card received within said receiving means to a voucher received therein;
  3. coordinated sensing means to sense when a card and voucher received within said receiving means emanate from a common origin; and,
  4. lock means responsive to the sensing means to maintain the indicia-imparting means in an inoperative condition until such time as the sensing means senses receipt of a card and voucher of common origin within said receiving means.

5. A system according to claim 4 wherein the machine further comprises means to selectively adjust the sensing means for the sensing of cards and vouchers emanating from a particular common origin.